June 5, 1951  O. F. SCOTT ET AL  2,555,422
LIE DETECTOR
Filed June 19, 1947
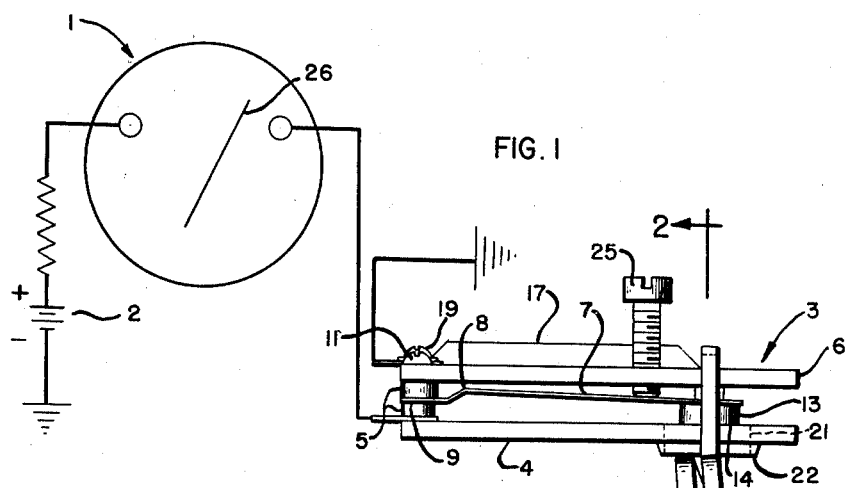
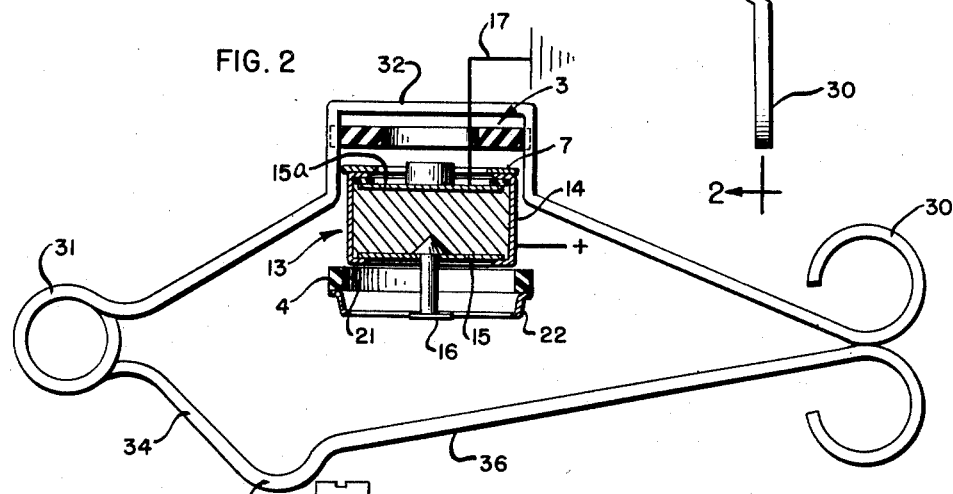
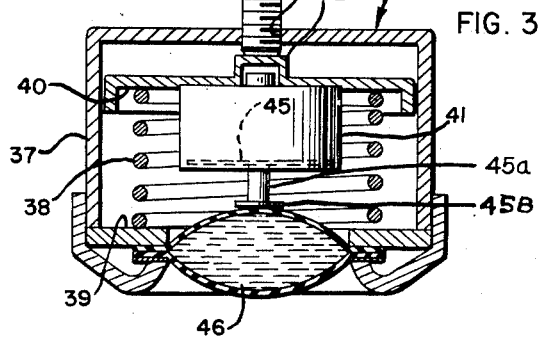
INVENTORS
ORLANDO F. SCOTT
DAN T. FERNANDEZ
BY  *Joshua R H Potts*
THEIR ATTORNEY Patented June 5, 1951

2,555,422

UNITED STATES PATENT OFFICE 2,555,422

LIE DETECTOR

Orlando F. Scott, Chicago, and Dan T. Fernandez, Villa Park, Ill., assignors to M. E. Scott Trust, Chicago, Ill., a partnership Application June 19, 1947, Serial No. 755,632

12 Claims. (Cl. 128—2.1)

This invention relates to a lie detector.

It is an object of this invention to provide a lie detector, which is of simplified construction, is sensitive, and which may be used without causing pain to the subject.

Another object of the invention is the provision of a lie detector which is inexpensive to manufacture and is simple to assemble and operate, and which is not liable to easily become disarranged.

Another object of our invention is to provide a clamp carrying a contactor which may be applied to the arm or other part of the body of the subject in position over an artery so that variations in pulse will be indicated on an indicator.

A further feature of the invention is the provision of a pressure sensitive resistor, which is clamped in position over an artery, and produces a variation in electrical current which may be recorded on a suitable instrument, such as a milliammeter.

The lie detector of our invention transmits and indicates or records heart pulsations without pain or discomfort to the subject. This is accomplished by the transmission, as will hereinafter be described, of the blood pressure pulsations, so that they produce a variable electrical effect, which is transmitted to an indicator, so that the pulsations or differences in beats between pulsations can be accurately visualized in terms of emotionally produced blood pressure variations. In practice, the apparatus is adjusted so that the initial or normal blood pressure, which is indicated on the indicator or recorded, is brought into the most accurate section of the scale of the indicator, and this adjustment may be made by the examiner prior to the commencement of the test. The sensitive point may be interpreted in terms of true or false under questioning, in view of the variation in the excursions of the indicator.

It is well known that some subjects under duress have positive pulsations and some exhibit negative pulsations and the same subject may have negative pulsations followed by positive pulsations. In operation, as the subject answers each question, the examiner also notes any accompanying increase of frequency of pulsation of the indicator needle and notes carefully the character and degree of fluctuations of the indicator. A chart provided with the instrument is then marked by the examiner to indicate the norm of the subject. This is established by the answers of the subject to a few preliminary questions. At the end of the test, the examiner having noted the pulsations and fluctuations on the chart, is able to make comparisons between true and false answers.

Further objects and advantages will appear and be brought out more fully in the following specification, reference being had to the accompanying drawings, in which:

Figure 1 is a view illustrating the apparatus of the invention.

Figure 2 is a section taken on line 2—2 of Figure 1 and

Figure 3 is a similar section of a modification.

Referring to the drawing, there is shown an indicator 1 which may be a milliammeter, and within the case of the indicator there may be carried a small dry cell 2 for supplying electrical current for operation of the milliammeter. A pressure contactor 3 of any suitable construction may be employed to transform the blood pulsations into an electrical value. In the preferred embodiment shown, the contactor is composed of an insulator plate 4 having suitable posts 5 therein by which a second plate 6 is secured thereto. Intermediate the plates is a leaf spring member 7, which is bent at 8 and has an end 9 suitably secured to the posts at one end. One of the posts may provide a binding post 11, which is electrically connected with the leaf spring 7.

Suitably attached to the leaf spring 7 is a carbon pile member 13 comprising an outer case 14 suitably secured to the leaf spring, and having diaphragms 15 and 15a at the opposite ends, to one of which may be secured a suitable bearing member 16. A wire 17 is connected to the diaphragm 15a of the carbon pile and is secured to a binding post 19. The insulation plate 4 has an opening 21 therein surrounded by a rib 22. The bearing member 16 extends through the opening in plate 4 within the confines of the rib. An adjusting screw 25 suitably screwed into the upper plate 6 bears on the leaf spring 7 and serves to adjust the position of the bearing button 16, so as to supply an initial bias in the electrical circuit for positioning the indicator 26 in the most sensitive position of the scale.

A clamping member 30 as illustrated, is made of a narrow band or strip of flat wire providing a spring turn 31 intermediate the ends, and having an offset portion 32, which receives the contact member 3, the member being held thereon by the resilient clamping action of the offset portion. The opposite branch 34 of the clamp has an offset 35 from which extends a section 36 that is positioned substantially opposite to the pressure contactor 3 when applied to the wrist of the subject.

In use, the pressure contactor 3 is inserted in the offset portion 32 of the clamp, and the clamp then is applied to the wrist or arm of the subject with the bearing member 16 extending through opening 21 against an artery of the subject. The beat pulsations as indicated in the artery will produce corresponding pulsations against contactor member 16 which will produce corresponding variations in resistance of carbon pile member 13 which in turn are indicated by fluctuations of ammeter indicator 26. By adjustment of screw 25, the initial pressure of contact member 16 on the carbon pile may be adjusted to bring the fluctuation of indicator 26 to the most sensitive part of the scale. The rib 22 surrounding contactor 16 and the provision of a narrow clamp member 30 serve to eliminate variations due to movements of the subject. As the subject answers each question, the examiner notes carefully the character and degree of fluctuation of the heart action as shown on the indicator 26 on a suitable chart, and after the test the examiner is able to make comparisons to establish the different action between true and false answers.

In the modification shown in Figure 3, there is a modified form of pressure contactor. There is a cylindrical chamber 37. Located in this chamber is a spring 38, which is adapted to abut between the bottom 39 of the chamber and a movable wall 40. Adapted to be secured solidly to the wall is a carbon pile 41. Also, located on the movable wall 40 is a projection 42, and fixed to said projection is a screw 43, which is also adapted to extend through a threaded bore 44 in the chamber 37. Inside the carbon pile at the bottom is a diaphragm 45, having a depending shank 45a and a pressure plate 45B. Adapted to press against this plate is a resilient member 46 which may be made of rubber with some such medium as air, liquid, etc. The pressure member may be fastened to the chamber by any suitable means, such as by securing the same by clamping rings. This arrangement has the advantage that by adjusting the screw 43, the diaphragm of the carbon pile may be placed in the most suitable relation to the pressure member. When it is desired to use the device on another party, the screw may be retracted and the spring will move the wall 40 outwardly away from the resilient member 46.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent is:

1. A portable lie detector comprising an externally applied body pressure contactor having a pressure sensitive element, a means to quickly engage said contactor to the subject's body so that said element is directly over an artery said means being also quickly disengageable, a means indicating the changes in heart activity from blood pressure received at said element as caused by the subject's emotions, said means to indicate including means for setting same so that the indicator will be at the most sensitive reading when the subject is in his least active emotional state, without removing said element from working relation with the subject's body.

2. A portable lie detector comprising an electrical indicator which operates within a given electrical pressure range, a physical pressure sensitive body contactor with means for transforming physical blood pressure and heart pulsations into corresponding electrical energy pressure and pulsations and transmit same to said indicator, means to secure and hold said contactor against the skin of the subject with sufficient pressure to be activated by the physical artery pulse action of the subject, and means to adjustably increase and lessen the pressure of said contactor against the skin without removing same to vary the force of such physical action and serve to accordingly vary the electrical pressure to bring same within the range of said indicator.

3. A portable lie detector comprising an electrical indicator which has a normally sensitive and more sensitive electrical pressure range, a physical pressure sensitive body contactor with means for transforming blood pressure and heart pulsations into corresponding electrical energy pressure and pulsations and transmit same to said indicator, means to secure and hold said contactor against the skin of the subject with sufficient pressure to be activated by the physical artery pulse action of the subject, and means to adjustably increase and lessen the pressure of said contactor against the skin to vary the force of such physical action and serving to accordingly vary the electrical energy pressure and cause said indicator to register within its most sensitive range when the subject is in the least emotional state, without removing said contactor from the skin of the subject.

4. A portable lie detector comprising a body engaging holder, a plate carried by said holder at a distance from the body of the subject when the holder is engaged, a body contactor disposed between said plate and the engaged body and against same, said contactor embodying a transforming means responding to the physical pressure and pulsations of the blood in the subject's body and converting same to corresponding electrical pressure and pulsations, a means to adjust said contactor to more or less pressure against the body in relation to said holder; and an electrical indicator connected with said transforming means and adapted to receive said electrical pressure and pulsations to the degree determined by the adjusted pressure of said contactor against the subject's body.

5. A lie detector comprising a body engaging holder, a plate carried by said holder at a distance from the body of the subject when the holder is engaged, a body contactor disposed between said plate and the engaged body and against said body, said contactor embodying a transformer means responding to the physical pressure and pulsations of the blood in such body and converting same to corresponding electrical pressure and pulsations, a means to adjust said contactor to more or less pressure against the body in relation to said holder, while said contactor is kept pressed against such body, an electrical indicator connected with said transformer means adapted to directly receive said electrical pressure and pulsations to the different degrees determined by the adjusted pressure of said contactor against such body, and an insulating stabilizer embodied with said plate and holder, said stabilizer co-bearing with said contactor against the body of the subject.

6. A lie detector comprising a plate, a body contactor means disposed between said plate and the subject's body and against same when said detector is applied, said contactor embodying a transformer means responding to the physical pressure and pulsations of the blood in such body and converting same to corresponding electrical pressure and pulsations, a means to adjust said contactor to more or less pressure against the body, consisting of a flat spring one end of which is secured to said plate and the other end of which mounts and guides said contactor when adjusted said spring tending to urge said contactor away from the body, and an adjusting screw threaded through said plate against said spring and serving to force said contactor against the body in opposition to said spring, and an electrical indicator connected with said transformer means and adapted to receive said electrical pressure and pulsations to the degree determined by the adjusted pressure of said contactor against the body.

7. A portable lie detector comprising a body engaging holder, a member adapted to be retained by said holder said member being spaced from the subject's body when said holder is engaged, a body contactor secured to said member embodying an element responding to the physical pressure and pulsations of the blood in the subject's body and converting same to corresponding electrical pressure and pulsations, a means to adjust said contactor in relation to said holder to more or less pressure against the subject's body, an electrical indicator connected with said element serving to register such electrical pressure and pulsations to the degree determined by the adjusted pressure of said contactor against the subject's body; and an insulating body contacting stabilizer embodied with said member and co-bearing with said contactor against the subject's body.

8. A lie detector comprising a non-yielding body contacting insulated stabilizer having a body exposing opening, an electrical indicator which has a normally sensitive and more sensitive electrical current pressure range, a physical pressure sensitive body contactor with means for transforming blood pressure and pulsations into corresponding electrical current pressure and pulsations and transmit same directly to said indicator, said contactor including a compressed carbon pile disposed over said opening, a stiff enclosure embodied with said carbon pile said enclosure having a comparatively extensive yielding carbon compression plate adjacent said opening, a body bearing member considerably smaller across than said plate, extending into said opening from said plate and serving to fluctuate said carbon pile through said plate when affected by the pulse action of the contacted body, and a means to adjust the compression of said carbon pile more or less to increase and lessen the flow of current to said indicator with the fluctuating action of said bearing member.

9. A portable lie detector comprising a body engaging holder, a chamber adapted to be retained by said holder said chamber having a remote head spaced from the subject's body by said holder when engaged; a body contactor within said chamber and against the subject's body when said holder is engaged said contactor embodying a transformer means which responds to the physical pressure and pulsations of the blood in the subject's body and which converts same to corresponding electrical pressure and pulsations, a means to adjust said contactor in relation to said holder to more or less pressure against the subject's body; and an electrical indicator connected with said transformer means serving to register such electrical pressure and pulsations to the degree determined by the adjusted pressure of said contactor against the subject's body.

10. A lie detector comprising a body engaging holder, a chamber adapted to be retained by said holder said chamber having a remote head spaced from the subject's body and an adjacent head held against the subject's body by said holder when engaged; a body contactor within said chamber and against the subject's body when said holder is engaged said contactor embodying a transformer means which responds to the physical pressure and pulsations of the blood in the subject's body and which converts same to corresponding electrical pressure and pulsations, a means to adjust said contactor in relation to said holder to greater or smaller pressure against the subject's body; an electrical indicator connected with said transformer means serving to register such electrical pressure and pulsations to the degree determined by the adjusted pressure of said contactor against the subject's body, and an insulating body contacting stabilizer embodied with said adjacent head and co-bearing with said contactor against the subject's body.

11. A lie detector comprising a chamber said chamber having a remote head normally spaced from the subject's body and an adjacent head to be normally held against the subject's body; a body contactor within said chamber and normally against the subject's body said contactor embodying a transformer means which responds to the physical pressure and pulsations of the blood in the subject's body and which converts same to corresponding electrical pressure and pulsations, a means to adjust said contactor to more or less pressure against the subject's body said means to adjust consisting of an over hanging plate disposed against said contactor between said remote head and contactor, an expansion coil spring tensioned between said plate and said adjacent head, and an adjusting screw threaded through said remote head against said plate; and an electrical indicator connected with said transformer means and serving to register such electrical pressure and pulsations to the degree determined by the adjusted pressure of said contactor against the subject's body.

12. A portable lie detector comprising a body engaging holder, a member adapted to be retained by said holder said member being spaced from the subject's body by said holder when engaged; a body contactor between said member and the subject's body and against the subject's body when said holder is engaged said contactor having a bearing member with a soft body bearing face, and embodying a transformer means which responds to the physical pressure and pulsations of the blood in the subject's body and which converts same to corresponding electrical pressure and pulsations, a means to adjust said contactor in relation to said holder to more or less pressure against the subject's body; and an electrical indicator connected directly with said transformer means serving to register such electrical pressure and pulsations to the degree determined by the adjusted pressure of said contactor against the subject's body.

ORLANDO F. SCOTT.
DAN T. FERNANDEZ.

REFERENCES CITED

The following references are of record in the file of this patent:

UNITED STATES PATENTS

| Number | Name | Date |
|---|---|---|
| 749,854 | Fahrney | Jan. 19, 1904 |
| 1,788,434 | Keeler | Jan. 13, 1931 |
| 2,239,330 | Lorand | April 22, 1941 |
| 2,341,137 | Damron | Feb. 8, 1944 |